Nov. 19, 1935. C. E. JOHNSON Re. 19,761

HYDRAULIC TAPPET

Original Filed Sept. 26, 1932

Inventor
Charles E. Johnson
By Livingston & Van Antwerp
Attorneys

Reissued Nov. 19, 1935

Re. 19,761

UNITED STATES PATENT OFFICE 19,761

HYDRAULIC TAPPET

Charles E. Johnson, North Muskegon, Mich.

Original No. 2,006,641, dated July 2, 1935, Serial No. 634,857, September 26, 1932. Application for reissue September 25, 1935, Serial No. 42,167

4 Claims. (Cl. 123—90)

This invention relates to hydraulic tappets and more particularly to such tappets used to operate poppet valves in internal combustion engines. The device embodying this invention is of the same general nature as that disclosed in my copending patent application filed Jan. 11, 1932, Serial No. 585,859, in which hydraulic means are provided for automatically taking up all clearance between the valve tappet and the valve stem and the principal object of this invention is to provide means for eliminating air which inadvertently enters the hydraulic pressure medium such as oil used in the pressure lubricating system of the automobile.

In the customary installation of a device of this nature in an internal combustion engine the conventional pressure lubricating system is utilized to furnish oil under pressure to the hydraulic means provided in the valve tappet and the small amounts of air which become mixed with the oil are detrimental to the perfect operation of the valve tappet. The device depends for its operation upon the incompressible quality of oil and inasmuch as air lacks that quality and is compressible, when any considerable amount of it is contained in the oil within the valve tappet, it will permit relative movements of the parts which should not occur in perfect operation and for that reason it is desirable to eliminate the air which inadvertently enters with the oil into the hydraulic means of the valve tappet.

The invention provides various novel features of construction and arrangement as hereinafter more fully described and particularly pointed out in the claims, reference being had to the accompanying drawing, in which, Fig. 1 is a vertical section of a portion of a conventional internal combustion engine showing a poppet valve, a cam and a valve tappet embodying this invention in operative position.

Like reference numbers refer to like parts in all the figures.

Figure 1:
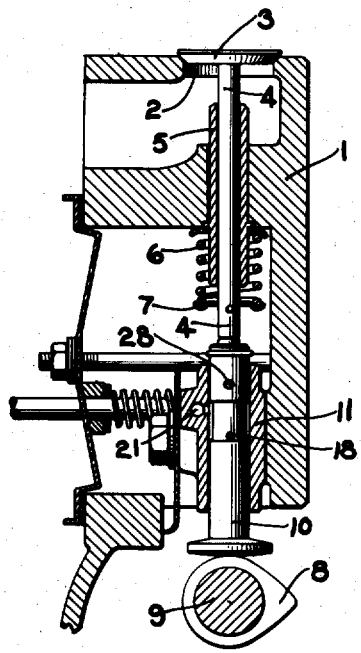
Figure 2:
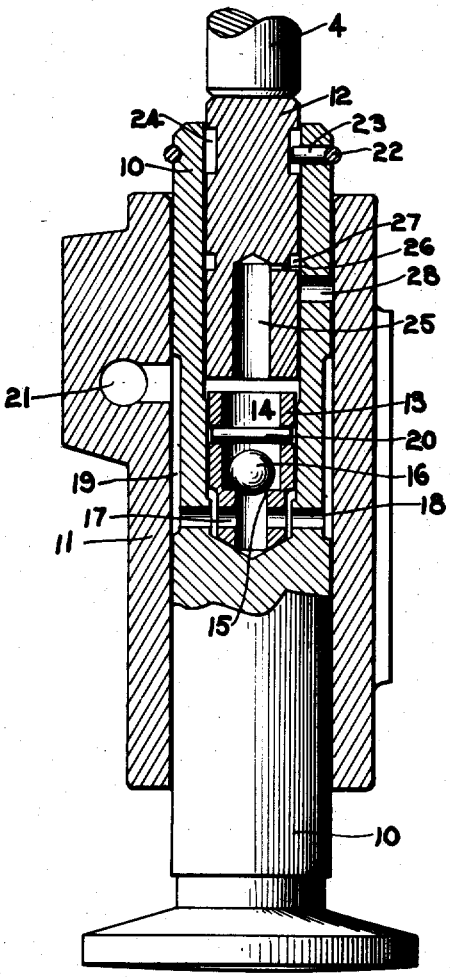
Fig. 2 is an enlarged elevation, partially in section, of a valve tappet embodying this invention shown in lowered position in its guide.

1 represents the engine casting which is provided with a valve opening 2 and a poppet valve 3 is arranged to close the opening 2 having a conventional seat at the edge of the opening. The valve stem 4 passes through a valve stem guide 5 and is provided with a valve spring 6 which spring seats at its upper end against a fixed part of the engine and at its lower end on a spring seat 7 fastened to the valve stem 4. A cam 8 on a cam shaft 9 is located below the valve stem 4 and a valve tappet is interposed between the cam 8 and the lower end of the valve stem 4.

The tappet comprises a body 10 which is mounted for vertical sliding movement in a tappet guide 11. The upper end of the tappet body 10 is provided with an axial opening in which is located a slidable plunger 12. A check valve cage 13 is located in the opening below the plunger 12, said opening being of slightly reduced diameter at the location of the cage and the cage being of exterior diameter to provide a press fit into said reduced portion of the opening. The cage has an axial opening 14 which is reduced to provide a seat 15 for the ball check valve 16 and lateral openings 17 are provided below the ball 16 which communicate with lateral openings 18 which extend through the body 10 of the tappet and communicate with an annular groove 19 therein.

A small rod or pin 20 extends across the opening 14 of the cage a short distance above the ball 16 to limit the movement of the ball in a direction away from its seat. A passage 21 is in communication with the oil pressure lubricating system of the engine and leads to the interior of the tappet guide 11 at a point where it will communicate with the annular groove 19 in the tappet body so that oil under pressure will be conducted into the interior of the tappet body through the passages 18 and 17 and past the ball check valve 16.

As previously stated, the valve tappet is interposed between the cam 8 and the lower end of the valve stem 4 and it is of proper length that when the slidable plunger 12 is in retracted or lower position and when the cam is in position to lower the tappet, there will be a slight space or clearance between the upper end of the plunger 12 and the lower end of the valve stem 4. The plunger is moved upwardly relative to the tappet body which acts upon the lower end of the plunger.

Figure 3:
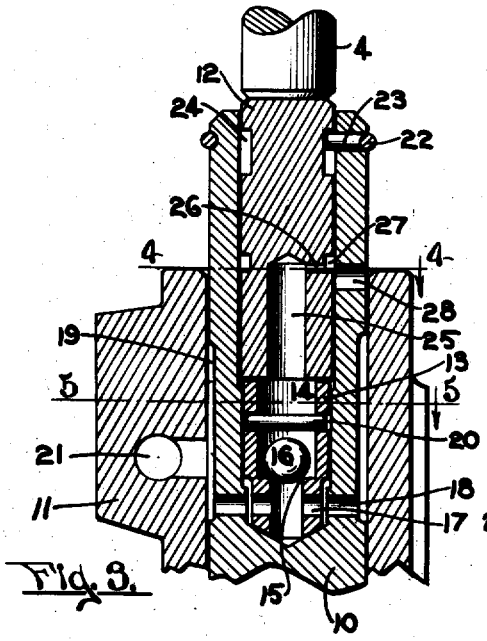
Fig. 3 is a fragmentary section of the upper portion of the parts shown in Fig. 2 showing the valve tappet in raised position in its guide.
Figure 4:
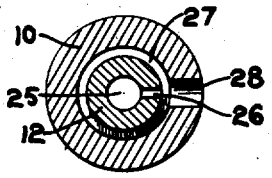
Fig. 4 is a sectional plan view on the line 4—4 of Fig. 3.
Figure 5:
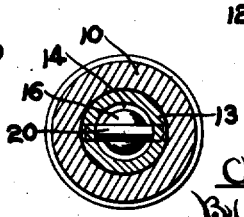
Fig. 5 is a sectional plan view on the line 5—5 of Fig. 3.

Movement of the plunger is limited by a retainer which is in the nature of a ring 22 surrounding the upper end of the tappet body 10 and having an end 23 projecting inwardly into an annular groove 24 in the plunger 12. The width or vertical dimension of the groove 24 is sufficient to permit movement of the plunger 12 within the desired operating range but will prevent movement of the plunger beyond that range especially in an upward or outward direction. The plunger in its downward or inward movement may be stopped by the end 23 of the retainer or the lower end of the plunger may engage against the upper end of the valve cage 13 as shown in Fig. 3.

A central opening 25 is provided in the plunger extending upward from its lower end into which the oil will rise and also any air which may be contained in the oil will rise into this opening 25 by reason of the differences in specific gravity and at the upper end of the opening 25 a small outlet opening 26 is provided which extends through the body of the plunger and communicates with an annular groove 27 in the outer surface of the plunger.

A passage 28 is provided through the wall of the tappet body 10 in a position where it will communicate with the groove 27 when the plunger is in lower position but said groove will be out of communication with the passage 28 when the plunger is raised. The outlet opening 26, the groove 27 and the passage 28 are for the purpose of permitting the escape of air from the interior of the device and it may be here stated that the air will escape from the passage 28 between the tappet 10 and the tappet guide 11 since there must be some looseness or clearance in the fit of the tappet in the tappet guide for proper operation, such clearance being sufficient to permit the escape of small quantities of air which are to be eliminated. However, the clearance is not sufficient to permit any material quantity of oil to escape from the inlet passage 21 and thus the oil pressure will be transmitted to a point underneath the plunger 12 to cause its upward movement.

*Operation*

Before the engine commences to run, and especially if it has been standing idle for some time, the pressure will have vanished from the lubricating system which is in communication with the interior of the tappet 10 which permits the plunger 12 to recede or lower causing a gap between the upper end of the plunger and the lower end of the valve stem. Immediately upon beginning operation of the engine a pressure is attained in the pressure lubricating system of the engine and also within the valve tappet which causes the plunger to rise into close engagement with the lower end of the valve stem. The pressure of the oil in the system is not sufficient to raise the valve spring 6 but will act to lift the weight of the plunger 12 until it is stopped by engagement with the valve stem 4.

The oil to produce this lifting action has entered from the passage 21 into the annular groove 19 and thence passes through the passages 18 and 17 and past the ball check valve 16 into the interior of the tappet body 10 and the ball check valve 16 prevents return movement of the oil and traps the oil which has entered to hold the plunger 12 to the position to which it has been extended because of the incompressibility of the oil. Action of the cam 8 to raise the tappet body then lifts the valve 3 compressing the valve spring 6, this action being exerted through the plunger 12 and the oil trapped under it within the tappet body.

The upward movement of the plunger to engage with the valve stem has caused the groove 27 to move out of communication with the passage 28 and therefore prevents the escape of oil through the outlet opening 26. As the engine operates the cam repeatedly lifts the tappet 10 and then lowers it causing a similar action of the valve 3. During the period when the cam holds the tappet in raised position a considerable force is applied downwardly on the plunger 12 but this force is resisted by the oil trapped below the plunger by the ball check valve 16. During the intervals between the raised position of the tappet and when the valve 3 rests upon its seat, there is no downward thrust by the valve against the plunger 12 and the pressure of the lubricating system is sufficient to renew the supply of oil under the plunger 12 to take the place of any leakage which may have occurred by supplying additional oil under pressure past the ball check valve 16 and thus the plunger 12 is maintained in constant engagement with the valve stem 4 during the operation of the engine.

The foregoing description of the operation is as it would occur providing that there were no air mixed with the oil in the space below the plunger 12 and above the ball 16. Entrance of air mixed with the oil into that space in any appreciable quantity will cause the oil, so mixed with air, to have the quality of being compressed. When this occurs the considerable force exerted downwardly upon the plunger 12 when the cam 8 raises the tappet will cause the plunger 12 to lower within the tappet body because of the compressible quality of the oil mixed with the air, to a position shown in Fig. 3 which will cause communication between the groove 27 and the passage 28 permitting the escape of air or combined oil and air from the interior of the tappet.

It is assumed that the air will separate from the oil to a large extent, by reason of the differences in their specific gravity, and rise to the top of the opening 25 so that the air will be expelled through the opening 26 and the oil within the tappet body cleared from its air content within a reasonably short time. During each interval of lowered tappet position the part of the contents of the interior of the tappet which has been expelled as described through the outlet 26 will be replenished by oil injected past the ball valve 16 and when substantially all of the air has been separated from the oil, which oil will be then incompressible, the plunger will not lower to communicate the groove 27 with the passage 28 and no further escape of the contents of the interior of the tappet body will occur.

With this construction it will be seen that so long as clear oil unmixed with air is contained within the tappet body its incompressibility will hold the plunger 12 in raised position in which the groove 27 will not communicate with the passage 28 and the oil will be positively trapped within the tappet body excepting for such small leakage as may occur, either around the plunger 12 or past the ball valve 16. Any entrance of air into the tappet chamber in sufficient quantities to permit yielding of the plunger 12 in a downward direction will automatically cause communication between the groove 27 and the passage 28 whereby such air will be expelled through the outlet opening 26 and the expelled air will be replaced by additional oil supplied at the rest position of the tappet.

The invention has been described as embodied in a tappet for operating the poppet valve of an internal combustion engine but it is conceived that the same invention will be applicable to other devices. In any mechanism in which one part is to be moved by action of another part and wherein clearance between the parts is to be eliminated and especially where there may be an alteration in the dimensions of the parts due to change of temperature, wear, etc., which would make a permanent adjustment impossible, a device made in accordance with this invention is applicable.

It is also conceived that other sources of pressure than the pressure lubricating system of an engine may be utilized to supply fluid under pressure to the device and its operation. Even when the tappet is used in an internal combustion engine having a pressure lubricating system it may be desirable to supply fluid pressure for the tappet mechanism by some other suitable means.

It is to be understood, of course, that the tappet will probably be used in multiple in an internal combustion engine, one tappet being used for each valve and that when so used a common source of fluid under pressure supplies all of the tappets.

The invention is defined in the appended claims and is to be considered comprehensive of all forms of structure coming within their scope.

I claim:

1. A device of the class described comprising, a body having an interior opening, a plunger slidably mounted in said body and extending into said interior opening, means for supplying oil into said interior opening to extend said plunger, a second means for carrying away air from said interior opening, and a third means controlled by movement of said plunger for closing the second means when the plunger is extended and for opening the same when the plunger is retracted.

2. A tappet comprising, a tappet body having a normally vertical axis, an axial opening extending into said tappet body from the upper end thereof, a plunger extending into said axial opening and vertically movable therein, means for feeding oil into said axial opening below said plunger, means for trapping oil fed into said axial opening, a recess in the lower end of said plunger, an outlet passage in the plunger communicating with the upper portion of said recess, and a passage through the tappet body in a position to communicate with said outlet passage in the plunger when the plunger is in relatively retracted lower position and to be out of communication with said outlet passage when the plunger is in extended raised position.

3. A tappet comprising, a tappet body having an axial opening extending through the upper end of said tappet body, a plunger slidably mounted in said axial opening, means for introducing oil into said axial opening, below said plunger, check valve means for trapping oil introduced into said axial opening, an opening in said plunger extending upwardly from the lower end thereof and closed at its upper end, an annular groove in the outer surface of said plunger, a passage communicating between said annular groove and the upper portion of said opening in the plunger and a passage through the wall of said tappet body located in a position to communicate with said annular groove when the plunger is in relatively retracted lower position, said annular groove being out of communication with said passage in the tappet body when the plunger is in relatively extended raised position.

4. A valve tappet of the class described comprising, a tappet body having an interior opening, a plunger slidably mounted in said tappet body and extending into said interior opening, pressure means for introducing oil into said interior opening to extend said plunger and outlet means leading from said interior opening, said plunger rendering the outlet means inoperative at a certain predetermined range of positions.

CHARLES E. JOHNSON.